US005977681A

United States Patent [19]

Retzlaff

[11] Patent Number: 5,977,681

[45] Date of Patent: Nov. 2, 1999

[54] METAL BELT AND COLLECTOR RING ASSEMBLY FOR TRANSFERRING ELECTRICAL CURRENT TO A ROTATING BODY

[75] Inventor: Scott G. Retzlaff, Walton, Nebr.

[73] Assignee: Insul-8 Corp., Omaha, Nebr.

[21] Appl. No.: 09/016,904

[22] Filed: Feb. 2, 1998

[51] Int. Cl.[6] .......................... H02K 13/00; H01R 39/18; H01R 39/08

[52] U.S. Cl. .......................... 310/219; 310/238; 310/251; 439/23

[58] Field of Search .................................... 310/219, 231, 310/238, 248, 251, 232, 143; 439/11, 13, 29, 24, 23, 20, 21, 18, 28; 239/728; 74/5.6 D

[56] References Cited

U.S. PATENT DOCUMENTS

| | | | |
|---|---|---|---|
| 421,320 | 2/1890 | Schmid et al. | 310/219 |
| 1,876,235 | 9/1932 | Iio | 310/219 |
| 2,668,923 | 2/1954 | Bondley | 310/236 |
| 3,546,509 | 12/1970 | Chang | 310/236 |
| 3,590,171 | 6/1971 | Harrington | 191/12.2 |
| 3,617,785 | 11/1971 | Kristiansen | 310/236 |
| 3,619,681 | 11/1971 | Ginkel et al. | 310/232 |
| 3,636,394 | 1/1972 | Forste et al. | 310/232 |
| 3,659,627 | 5/1972 | Zimmerer et al. | 137/344 |
| 3,782,408 | 1/1974 | Martin | 137/344 |
| 3,903,442 | 9/1975 | Krulls | 310/229 |
| 4,098,546 | 7/1978 | Swartz | 339/5 R |
| 4,180,092 | 12/1979 | Hunter et al. | 137/344 |
| 4,262,694 | 4/1981 | McConnell | 137/580 |
| 4,294,500 | 10/1981 | Wilson | 339/5 M |
| 5,252,878 | 10/1993 | Spellman et al. | 310/239 |
| 5,274,292 | 12/1993 | Lemmer et al. | 310/233 |

*Primary Examiner*—Nestor Ramirez
*Assistant Examiner*—Karl E. Tamai
*Attorney, Agent, or Firm*—Zarley, McKee, Thomte Voorhees & Sease; Dennis L. Thomte

[57] ABSTRACT

A collector ring for transferring electrical current between a non-rotatable member and a rotatable member. The collector ring comprises a first support which is fixed to the non-rotatable member and which has at least one conductive metal ring member mounted thereon which is electrically insulated from the non-rotatable member. An input terminal is electrically connected to each of the ring members for connection to a source of electrical energy. A second support is rotatably mounted on the first support with the second support being adapted to operatively mechanically connected to the rotatable member whereby rotation of the rotatable member with respect to the non-rotatable member will cause the second support to rotate with respect to the first support. An electrically conductive, flexible metal belt frictionally and movably embraces each of the ring members with the belts being mechanically connected to the second support so that rotational movement of the rotatable member will cause the belt to frictionally move with respect to the ring member. An output wiring connector is connected to the second support and is electrically connected to one of the belts whereby electrical current may be transferred from the input terminal, through the ring member, and through the belt to the output wiring connector.

8 Claims, 2 Drawing Sheets

METAL BELT AND COLLECTOR RING ASSEMBLY FOR TRANSFERRING ELECTRICAL CURRENT TO A ROTATING BODY

BACKGROUND OF THE INVENTION

1. Field of the Invention

This invention relates to a collector ring assembly and more particularly to a collector ring assembly which may be used for transferring electrical current from a non-rotatable member to a rotatable member.

2. Description of the Related Art

Collector ring assemblies have been provided for many years for transferring electrical current between a non-rotatable member and a rotatable member which is commonly required in mining shovels, crane pivots, rotational molding machines, steel turret ladles, etc. Heretofore, many different types of collector ring assemblies have been provided, but, in large part, the prior art collector ring assemblies include one or more electrically conductive collector rings which are normally fixed to the non-rotatable portion of the associated equipment and which are electrically connected to a source of electrical power. The prior art collector ring assemblies normally include some sort of supporting structure which is connected to the rotatable member and which has one or more carbon brushes supported thereon which are in electrical contact with the collector rings. The use of carbon brushes requires that the collector ring assembly be continuously maintained. Further, the carbon brushes leave brush dust on the collector rings which affects current capabilities, voltage drop, etc. Additionally, the collector ring assemblies are frequently used on heavy equipment which impart shock and vibration to the collector ring assemblies, which sometimes results in circuit interruption.

SUMMARY OF THE INVENTION

A collector ring assembly is provided for transferring electrical current between a non-rotatable member and a rotatable member such as commonly found on mining shovels, crane pivots, rotational molding machines, steel turret ladles, etc. The collector ring assembly comprises a first support which is fixed to the non-rotatable member. At least one conductive metal ring member, and normally several metal ring members, is mounted on the first support and is electrically insulated from the non-rotatable member. An input terminal is electrically connected to each of the ring members for connection to a source of electrical energy. A second support is rotatably mounted on the first support with the second support being adapted to be operatively mechanically connected to the rotatable member whereby rotation of the rotatable member with respect to the non-rotatable member will cause the second support to rotate with respect to the first support. An electrically conductive, flexible metal belt frictionally and movably embraces each of the ring members. The belts are mechanically connected to the second support so that rotational movement of the rotatable member with respect to the non-rotatable member will cause the belt to frictionally move with respect to the ring member. An output wiring connector is operatively connected to the second support and is electrically connected to one of the belts whereby electrical current may be transferred from the input terminal, through the ring member, and through the belt to the output wiring connector.

These and other objects will be obvious to those skilled in the art.

DESCRIPTION OF THE PREFERRED EMBODIMENT

Figure 1:
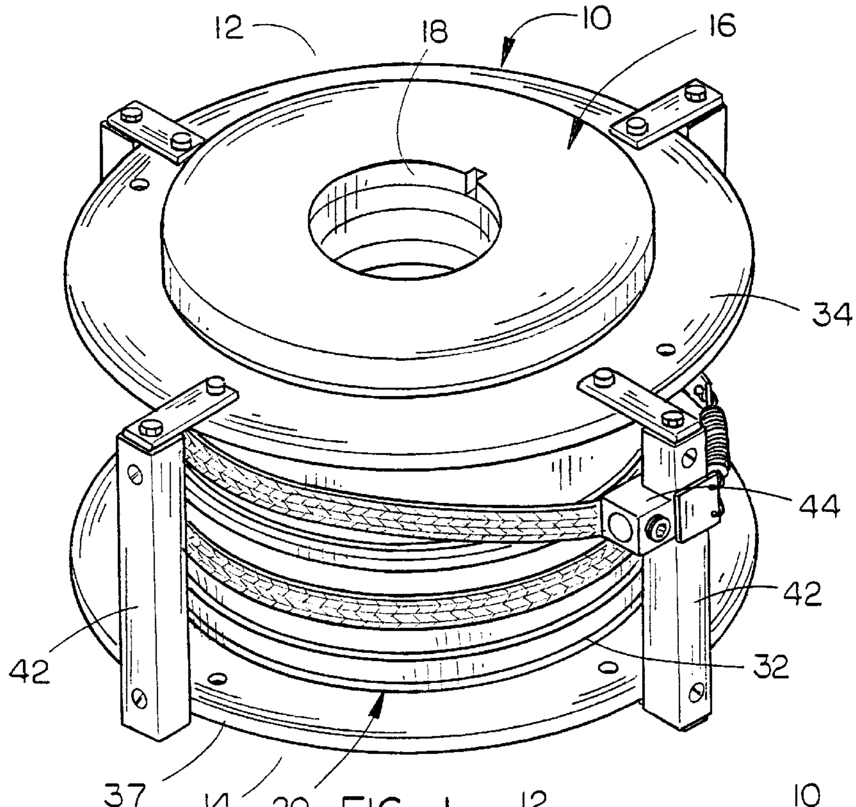
FIG. 1 is a perspective view of the collector ring assembly of this invention.

The collector ring assembly of this invention is referred to generally by the reference numeral 10 and is designed to transfer electrical current between a non-rotatable member of a mining shovel, crane pivot, rotational molding machine, steel turret ladle, etc., to a rotatable member thereof. Although the drawings illustrate the collector ring assembly as having an upper end 12 and a lower end 14, it is possible that the collector ring assembly may be oriented in a horizontally disposed position rather than a vertically disposed position.

Figure 2:
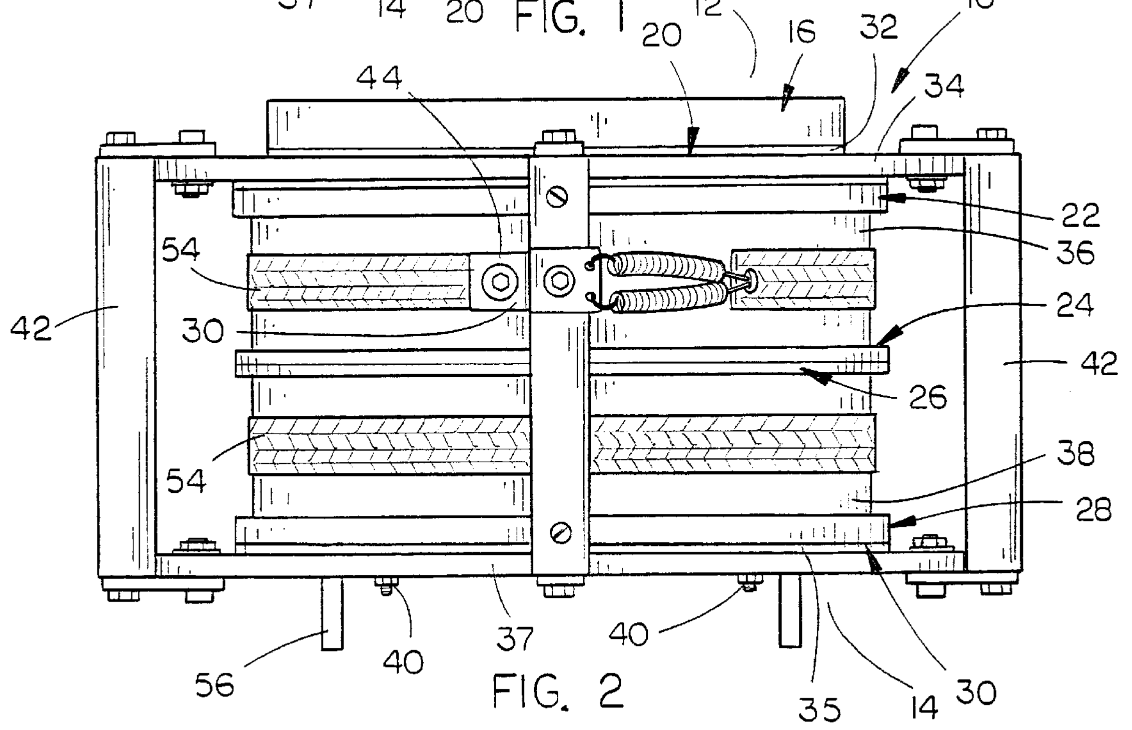
FIG. 2 is a side view of the collector ring assembly of this invention.
Figure 3:
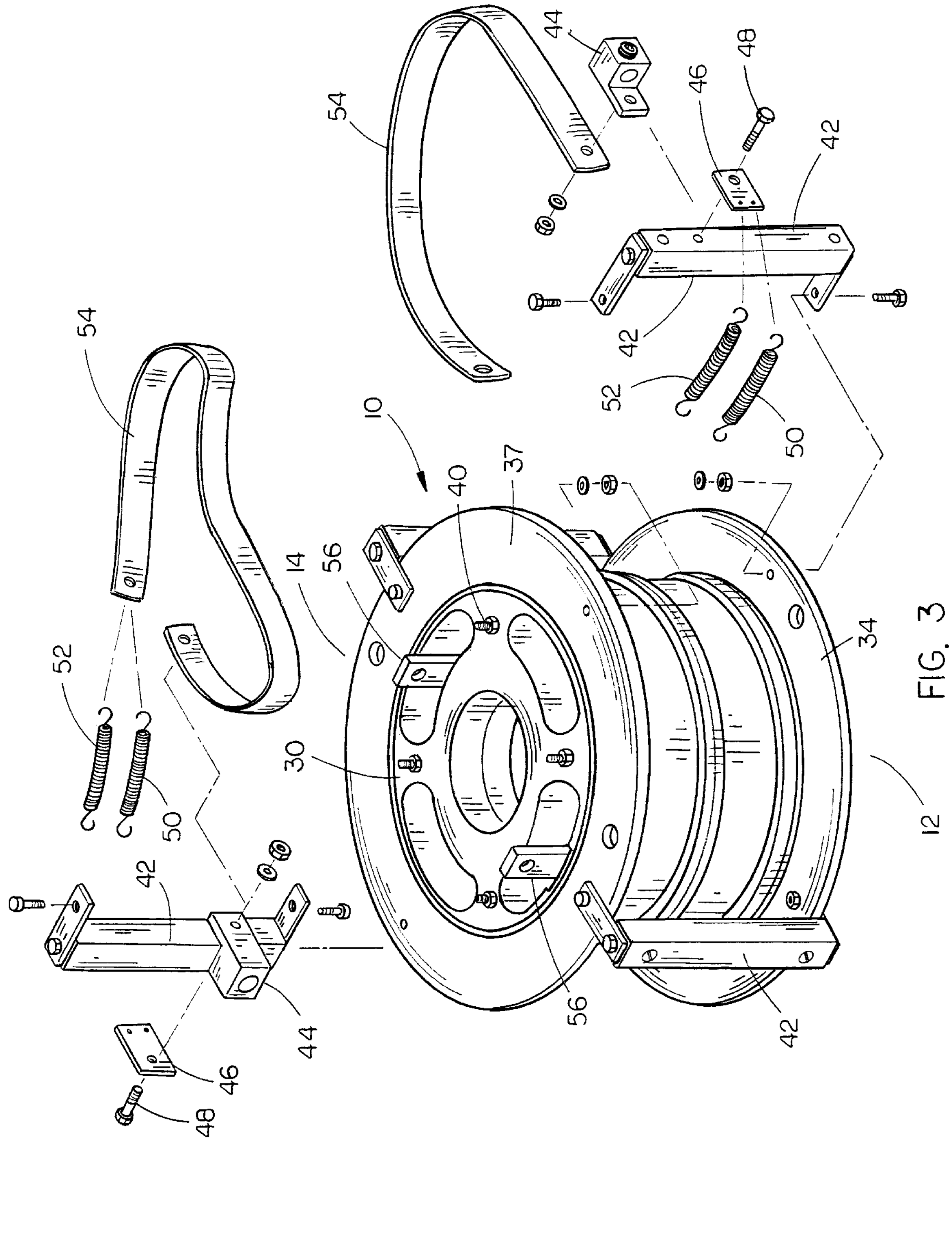
FIG. 3 is an exploded perspective view of the collector ring assembly of this invention with the collector ring assembly being shown in an inverted position.

Collector ring assembly 10 includes a first disc-shaped support 16 which is comprised of a non-conductive material and which has a central opening 18 provided therein. Insulator rings 20, 22, 24, 26, 28 and 30 are stacked upon one another in an alternating fashion. Each of the rings 20, 22, 24, 26, 28 and 30 includes a body portion having a rim portion extending outwardly therefrom. As seen in FIG. 2, the rim portions of insulator rings 20 and 22 are back-to-back as are the rim portions of insulator rings 24 and 26 and the rim portions of insulator rings 28 and 30. Preferably, insulator ring 20 is provided with a brass bearing 32 therein which rotatably receives non-conductive disc-shaped member 34 thereon. Preferably, insulator ring 30 is provided with a brass bearing 35 which rotatably receives non-conductive disc-shaped member 37 thereon.

The body portions of insulator rings 22 and 24 have an electrically conductive collector ring 36 positioned thereon while the body portions of insulator rings 26 and 28 have an electrically conductive collector ring 38 positioned thereon. Preferably, the insulator rings are comprised of a glass-reinforced thermoplastic resin. Preferably, the collector rings 36 and 38 are comprised of a brass material. It should be noted that the collector ring assembly may include a single collector ring or several collector rings.

A plurality of elongated bolts 40 secure the insulator rings 20, 22, 24, 26, 28 and 30 together and to disc-shaped support 16. Disc-shaped support 16 is secured by any convenient means to the non-rotatable member of the equipment upon which the collector ring assembly is being used.

A plurality of posts 42 are secured to and extend between the disc-shaped members 34 and 37 in any convenient manner. One or more output wiring connectors 44 are secured to the posts 42 and are adapted to have output wires connected thereto in conventional fashion.

Bracket 46 is secured to connector 44 by screw 48 and is adapted to have one end of electrically conductive springs 50 and 52 secured thereto. Obviously, the number of connectors 44 and the number of brackets 46 will correspond to the number of collector rings being utilized on the collector ring assembly 10. The numeral 54 refers to flexible, electrically conductive metal belts which frictionally and movably embraces the collector rings 36 and 38 in the manner illustrated in the drawings. Preferably, belt 54 is comprised of a metal material which is dissimilar from that of the brass collector ring. Preferably, belt 54 is of the woven wire type and is comprised of a tin coated copper material. Inasmuch as each of the belts 54 are identical, only one belt 54 will be described in detail. One end of belt 54 is attached to the springs 50 and 52 and the other end of belt 54 is secured to connector 44 by the screw 48. One or more electrically conductive input terminals 56 extend upwardly through the openings formed in the insulator rings or electrical connection to a collector ring. The number of terminals 56 will normally correspond to the number of collector rings being utilized. Each of the terminals 56 is adapted to be connected to a source of high current and high voltage electrical power.

In the normal or usual situation, the support 16 is secured to or supported on the non-rotatable part of the shovel, crane, etc., with the disc-shaped members 34 and 37 being operatively secured or connected to the rotatable part of the shovel, crane, etc., so that rotation of the rotatable part of the equipment will cause disc-shaped members 34 and 37 to rotate with respect to the fixed support 16. Rotation of the members 34 and 37 also obviously causes the posts 42 to be moved with respect to the fixed collector rings which causes the belts 54 to frictionally move with respect to the associated collector ring. In some situations, the posts 42 may not be connected to the disc-shaped members 34 and 37, but will be directly connected to the rotatable part of the equipment so that rotation of the rotatable part of the equipment will cause the belts 54 to frictionally move with respect to the collector rings.

In operation, high current and high voltage is supplied to the terminals 56 with that current and high voltage being supplied to the collector rings 36 and 38. The electrical current in the rings 36 and 38 is picked up by the belts 54 and transferred to the output terminals 44. The spring-loading of the belts 54 maintains constant belt contact pressure with the associated brass connector ring. The dissimilar metal construction of the belts 54 and the collector rings reduces maintenance of the assembly and eliminates the replacement of brushes. Further, the brush dust left by the conventional collector ring assemblies is eliminated. The large surface area of the tin coated copper belt 54 on the brass collector ring increases current carrying capabilities, reduces voltage drop and eliminates circuit interruption due to shock and vibration. The collector ring assembly can be configured in one or more individual collector ring stacked in line and will have different spacing of insulators based on the voltage requirement. Each connector ring will have an individual belt pick-up with connection for output wiring and each brass connector ring will have a connection for input wiring.

Thus, it can been seen that the invention accomplishes at least all of its stated objectives.

I claim:

1. A collector ring assembly for transferring electrical current between a non-rotatable member to a rotatable member, comprising:

a first support for attachment to said non-rotatable member;

said first support having at least one electrically conductive metal collector ring mounted thereon; said collector ring being electrically insulated from said non-rotatable member;

an input terminal electrically connected to said collector ring for connection to a source of electrical energy;

a second support rotatably mounted on said first support;

said second support being adapted to be operatively mechanically connected to said rotatable member whereby rotation of said rotatable member with respect to said non-rotatable member will cause said second support to rotate with respect to said first support;

an electrically conductive, flexible metal belt frictionally and movably embracing said collector ring;

means mechanically connecting said belt to said second support whereby rotational movement of said rotatable member with respect to said non-rotatable member will cause said belt to frictionally move with respect to said collector ring;

and an output wiring connector operatively electrically connected to said belt whereby electrical current may be transferred from said collector ring through said belt to said output wiring connector;

first and second disc-shaped members operatively rotatably mounted on said first support;

said second support including a post means secured to and extending between said first and second disc-shaped members;

said belt having opposite ends which are secured to said post means.

2. The assembly of claim 1 wherein a spring means connects one end of said belt to said post means.

3. The assembly of claim 1 wherein said output wiring connector is mounted on said post means.

4. The assembly of claim 1 wherein said first and second disc-shaped members are comprised of an electrically insulative material.

5. A collector ring assembly for transferring electrical current between a non-rotatable member to a rotatable member, comprising:

a first support for attachment to said non-rotatable member;

said first support having at least one electrically conductive metal collector ring mounted thereon; said collector ring being electrically insulated from said non-rotatable member;

an input terminal electrically connected to said collector ring for connection to a source of electrical energy;

a second support operatively mechanically connected to said rotatable member whereby rotation of said rotatable member with respect to said non-rotatable member will cause said second support to rotate with respect to said first support;

an electrically conductive, flexible metal belt frictionally and movably embracing said collector ring;

means mechanically connecting said belt to said second support whereby rotational movement of said rotatable member with respect to said non-rotatable member will cause said belt to frictionally move with respect to said collector ring;

and an output wiring connector operatively secured to said second support and operatively electrically connected to said belt whereby electrical current may be transferred from said collector ring through said belt to said output wiring connector;

first and second disc-shaped members operatively rotatably mounted on said first support;

said second support including a post means secured to and extending between said first and second disc-shaped members;

said belt having opposite ends which are secured to said post means.

6. The assembly of claim 5 wherein a spring means connects one end of said belt to said post means.

7. The assembly of claim 5 wherein said output wiring connector is mounted on said post means.

8. The assembly of claim 5 wherein said first and second disc-shaped members are comprised of an electrically insulative material.

* * * * *